United States Patent [19]

Komatsu

[11] Patent Number: 4,723,730
[45] Date of Patent: Feb. 9, 1988

[54] DRIVING DEVICE OF TAPE PLAYER

[75] Inventor: Norimasa Komatsu, Kakuda, Japan

[73] Assignee: Alps Electric Co., Ltd., Japan

[21] Appl. No.: 872,212

[22] Filed: Jun. 6, 1986

[30] Foreign Application Priority Data

Jun. 6, 1985 [JP] Japan .................. 60-85723

[51] Int. Cl.$^4$ .................. G11B 15/32; G11B 15/30; G03B 1/64
[52] U.S. Cl. .................. 242/204; 242/201; 242/205; 360/96.3
[58] Field of Search .............. 242/200, 201, 204, 205; 360/74.1, 74.2, 96.1–96.6

[56] References Cited

U.S. PATENT DOCUMENTS

| | | | |
|---|---|---|---|
| 2,620,404 | 12/1952 | Pond | 242/201 X |
| 3,009,663 | 11/1961 | Armstead | 242/201 |
| 3,900,174 | 8/1975 | Morimoto et al. | 242/201 X |
| 4,010,918 | 3/1977 | Kato | 242/204 X |
| 4,252,284 | 2/1981 | Suzuki | 242/201 |
| 4,337,910 | 7/1982 | Santoro | 242/204 |
| 4,448,370 | 5/1984 | Miyazi et al. | 242/201 |

Primary Examiner—John Petrakes
Attorney, Agent, or Firm—Guy W. Shoup

[57] ABSTRACT

A driving device of a tape player of the type wherein a flywheel; drive gear; and capstan shaft are driven integrally by a motor, a gear arm is provided so as to turn about the capstan shaft, two idle gears are supported on the gear arm each of which is in gear with the drive gear, a pair of reel stands are arranged each spaced equally from the capstan shaft, and reel gears rotatable together with the respective reel stands are positioned in opposition to the respective idle gears, which is characterized in that the idle gear opposite to the reel gear of the supply-side reel stand is provided with a mechanism for generating a frictional resistance, whereby the turning resistance of the idle gear opposite to the reel gear of the supply-side reel stand is set larger than the turning resistance of the idle gear opposite to the reel gear of the take-up-side reel stand. Preferably, the mechanism for generating a frictional resistance is a plate spring interposed between the idle gear opposite to the reel gear of the supply-side reel stand and its supporting shaft.

3 Claims, 4 Drawing Figures

DRIVING DEVICE OF TAPE PLAYER

BACKGROUND OF THE INVENTION

1. Field of the Invention

This invention relates to a tape player of the so-called center capstan type in which reel stands are provided at positions putting a capstan shaft therebetween and the capstan shaft is inserted into the center hole of a cassette half and, more particularly, to a driving device of the tape player for transmitting the turning force of the capstan shaft to the reel stands.

2. Description of the Prior Art

Micro-cassette tape and the like are driven by means of a capstan shaft inserted into the center hole of a cassette half.

For reference, FIG. 4 shows in plan view the schematic configuration of a general tape player of the so-called center capstan type in which a cassette half of the foregoing type is driven as it is inserted into the tape player. The tape player is provided with one motor M whose power is transmitted via a belt 1 to a flywheel 2. The flywheel 2 has a capstan shaft 3 formed integrally therewith and this capstan shaft 3 is supported rotatably by a housing metal (bearing) 10 provided on a chassis. The flywheel 2 has also a drive gear 4 formed integrally therewith.

By the housing metal 10 a gear arm 5 is supported rotatably, which supports a pair of idle gears 6 and 7. On the chassis there is provided a pair or reel stands Ra and Rb, and the idle gears 6 and 7 are positioned in opposition to rell gears 8 and 9 provided respectively on the reel stands. These idle gears 6 and 7 and gear arm 5 are designed so as to produce a friction torque therebetween; thus, as the drive gear 4 is driven and rotated together with the flywheel 2 by the motor M, the gear arm 5 turns in the same direction as the turning direction of the drive gear 4 before the respective idle gears 6 and 7 rotate. That is, as the drive gear 4 rotates in the clockwise direction the idle gear 6 comes into gear with the reel gear 8 of the take-up side, whereas as the same rotates in the counterclockwise direction the idle gear 7 comes into gear with the reel gear 9 of the supply side.

As is apparent from the foregoing, in order to make sure that the gear arm 5 turns when the flywheel 2 and drive gear 4 are rotated, a mechanism for producing a friction torque between the respective idle gears 6 and 7 and gear arm 5 must be interposed therebetween. As such a mechanism, in the prior art, plate spring or felt is interposed between the idle gears 6 and 7 and gear arm 5, or a frictional force appearing between the material of the idle gears 6 and 7 and the gear arm 5 is utilized.

In the prior art, however, a substantially identical frictional force is made to appear with respect to the respective idle gears 6 and 7; therefore, in the play mode wherein the left-hand-side idle gear 6 comes into gear with the reel gear 8 to drive and rotate the take-up-side reel stand Ra, the frictional force of the idle gear 6 works as a drive load. This drive load increases the power consumption of the motor and gives an influence to the dynamic precision of the player, for example, wow and flutter will appear.

SUMMARY OF THE INVENTION

The present invention has been devised in view of the foregoing problem of the prior art, and its general object is to provide a driving device of a tape player which can prevent the friction torque appearing between idle gears and gear arm from giving a bad influence to the play operation of the player, causes the gear arm to turn reliably by means of the power of a motor, and achieves smooth changeover of the power.

In brief, the present invention resides in a driving device of a tape player of the type wherein a flywheel; drive gear; and capstan shaft are driven integrally by a motor, a gear arm is provided so as to turn about the capstan shaft, two idle gears are supported on the gear arm each of which is in gear with the drive gear, a pair of reel stands are arranged each spaced equally from the capstan shaft, and reel gears rotatable together with the respective reel stands are positioned in opposition to the respective idle gears, which is characterized in that the idle gear opposite to the reel gear of the supply-side reel stand is provided with a mechanism for generating a frictional resistance, whereby the turning resistance of the idle gear opposite to the reel gear of the supply-side reel stand is set larger than the turning resistance of the idle gear opposite to the reel gear of the take-up-side reel stand. According to the present invention, the turning resistance of the idle gear of one side is made large by which the gear arm is caused to turn, and the turning resistance of the idle gear opposite to the reel gear of the take-up-side reel stand is made small; thus, in the play mode, the turning resistances of the idle gears do not work as the turning load of the whole mechanism.

DESCRIPTION OF THE PREFERRED EMBODIMENT

An embodiment of the present invention will now be described with reference to the drawings.

Figure 4:
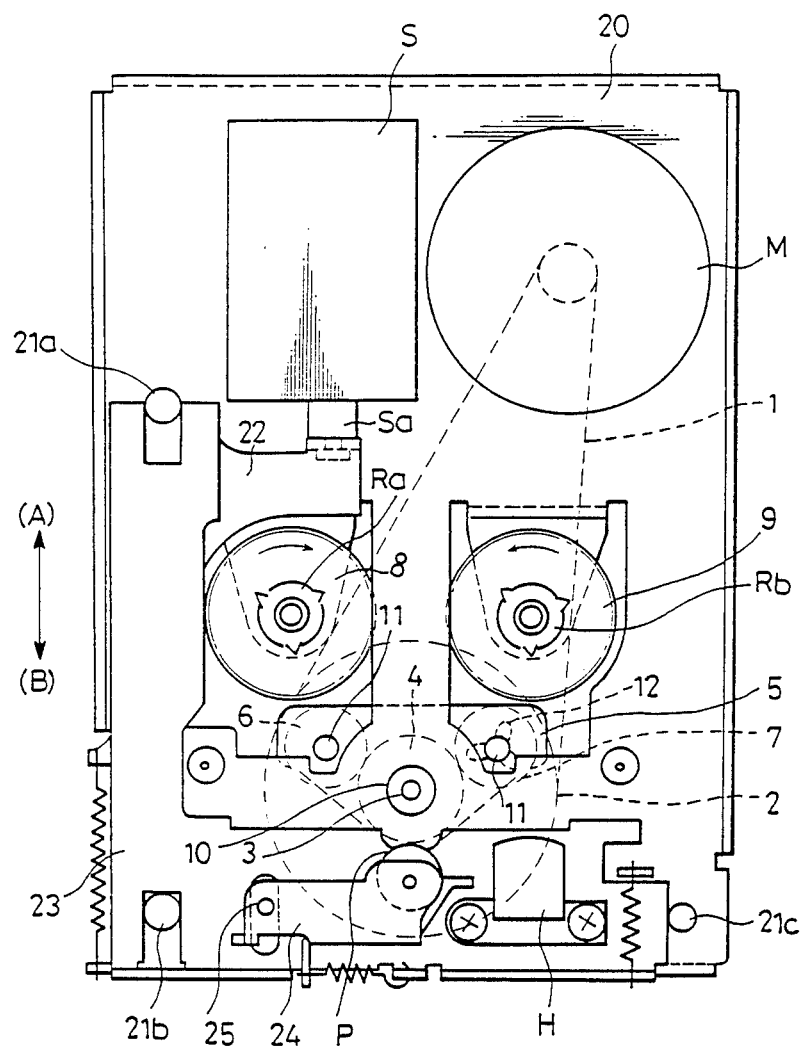
FIG. 4 is a plan view showing a schematic configuration of a general tape player.

The tape player shown schematically in FIG. 4 is suitable for use in driving a cassette half having in its center an insertion hole for a capstan shaft, such as microcassette tapes.

The tape player is provided with one motor M whose power is transmitted via a belt 1 to a flywheel 2. the flywheel 2 has a capstan shaft 3 formed integrally therewith and this capstan shaft 3 is supported rotatably by a housing metal ( bearing ) 10 provided on a chassis 20. The flywheel 2 has also a drive gear 4 formed integrally therewith.

By the periphery of the housing metal 10 a gear arm 5 is supported rotatably, which supports a pair of idle gears 6 and 7. On the chassis 20 there is provided a pair of reel stands Ra and Rb, and the idle gears 6 and 7 are positioned in opposition to reel gears 8 and 9 provided respectively on the reel stands. The reel stand Ra is for the take-up side and the reel stand Rb for the supply side.

Figure 1:
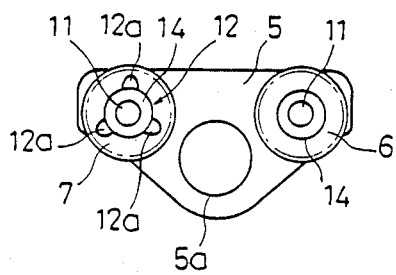
FIG. 1 is a plan view showing, upside down, a gear arm and idle gears making up a driving device of a tape player according to the present invention.
Figure 2:
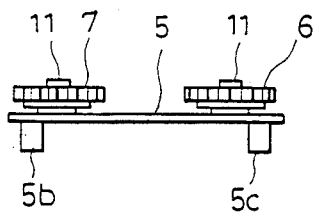
FIG. 2 is a side view of FIG. 1.

As shown in FIG. 1, the gear arm 5 is made by sheet metal into a substantially triangle shape and supported rotatably at its center hole 5a by the housing metal 10. On either end of the gear arm 5 a pair of stopper pins 5b and 5c are secured which extend upward ( downward in FIG. 2 ). On the upper surface of the gear arm 5 a pair of supporting pins 11 are fixed through caulking, for example, and by the respective supporting pins 11 and idle gears 6 and 7 are supported rotatably. These idle gears 6 and 7 are molded by resin.

Figure 3:
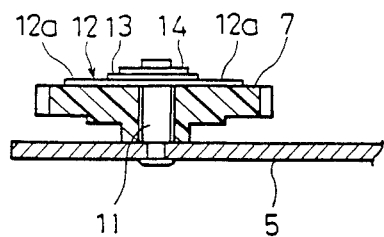
FIG. 3 is an enlarged sectional view of a part of FIG. 1.

As shown in FIG. 3, the idle gear of the left-hand side in FIG. 1 ( the right-hand side in FIG. 4 ), i.e. the idle gear 7 opposite to the reel gear 9 of the supply-side reel stand Rb, has a friction plate spring 12 attached on its upper surface. As shown in FIG. 1, this friction plate spring 12 has three arm portions 12a extending in three directions, which abut elastically on the upper surface of the idle gear 7. Further, on the friction plate spring 12 a thrust washer 13 is placed, and to the upper end of the supporting pin 11 a clamp ring 14 is attached. By the force of elastic contact of this friction plate spring 12 a certain turning resistance torque is generated on the idle gear.

On the contrary, the idle gear of the right-hand side in FIG. 1 (the left-hand side in FIG. 4), i.e. the idle gear 6 opposite to the reel gear 8 of the take-up-side reel stand Ra, is fitted on the supporting pin 11, on which the thrust washer 13 and clamp ring 14 are attached; but the foregoing friction plate spring 12 is not provided. Accordingly, the idle gear 6 can rotate in response to a very weak turning resistance torque.

On the chassis 20 there are provided three guide pins 21a, 21b and 21c, by which a drive board 22 and head base 23 are supported slidably in the direction of the arrow (A)—(B) shown in FIG. 4. The head bse 23 and drive board 22 are shaped analogously and mounted so that they can slide mutually independently while the head base 23 is piled on the drive board 22. The upper end in FIG. 4 of the drive board 22 is connected to a plunger Sa of a solenoid S.

On the head base 23 a magnetic head H is secured, which can move in the direction of the arrow (A)—(B) together with the head base 23. A pinch roller P opposite to the capstan shaft 3 is held by a roller bracket 24. This roller bracket 24 is supported rotatably on the chassis 20 by means of a shaft 25.

The operation of the tape player of the foregoing configuration will now be described.

FIG. 4 illustrates the stopped state of the tape player. The motor M is in stoppage and the solenoid S is in the non-energized state. Thus, the plunger Sa is not attracted, and the drive board 22 and head base 23 have returned toward (B) due to the force of a return spring. Therefore, the magnetic head H is separated completely from the tape and the pinch roller P is apart sufficiently from the capstan 3.

In the state shown in FIG. 4, as the rotary shaft of the motor M is started to rotate at a high speed clockwise, the flywheel 2 and drive gear 4 are driven in the same direction. Because a turning resistance is generated between the idle gear 7 of the right-hand side in FIG. 4 and the gear arm 5 by means of the friction plate spring 12, the idle gear 7 being in gear with the drive gear 4 drives the gear arm 5 so as to turn clockwise before the idle gear 7 rotates itself. As a result, the other idle gear 6 comes into gear with the take-up-side reel gear 8 and the reel stand Ra rotates at a high speed clockwise; thus, fast-feed of the tape takes place. Contrarily, if the rotary shaft of the motor M is rotated at a high speed counterclockwise, similarly to the above, the gear arm 5 turns counterclockwise due to the turning resistance of the idle gear 7 and the idle gear 7 comes into gear with the supply-side reel gear 9. Thus, the reel stand Rb is driven counterclockwise and rewind of the tape takes place.

At the time of commencing the reproducing (recording) operation, the solenoid S standing in the stopped state shown in FIG. 1 is energized to attract the plunger Sa. the drive board 22 connected to the plunger Sa and the head base 23 are pulled toward (A), and the magnetic head H on the head base 23 comes into abutment on the tape stored inside the cassette half. At the same time, the pinch roller P comes into press-abutment on the capstan shaft 3 while putting the tape therebetween.

In the above operation, if the rotary shaft of the motor M is rotated at a constant speed clockwise, the capstan shaft 3 rotates together with the flywheel 2 at a constant speed clockwise and the tape is fed leftward in FIG. 1. At the same time, by means of the friction torque of the idle gear 7 caused by the friction plate spring 12, the gear arm 5 turns in the clockwise direction and the other idle gear 6 comes into gear with the real gear 8. Accordingly, the turning force of the drive gear 4 is transmitted via the idle gear 6 to the reel gear 8 and the take-up-side reel stand Ra is driven clockwise. As a result, the reels provided inside the cassette half are driven and the tape is wound up. During the above operation, reproducing (recording) takes place by means of the magnetic head H.

As described hereinabove, the one "7" out of the paired idle gears which is opposite to the supply-side reel gear 9 has the friction plate spring 12, by which the friction torque is generated. On the contrary, the idle gear 6 opposite to the take-up-side reel gear 8 is designed so as to be vary small in turing resistance torque. Therefore, in the fast-feed mode and play mode of the tape, the reel gear 8 is driven by the idle gear 6 which is very small in turning resistance torque; thus, the load of the rotary system in either of these modes becomes very small. However, when the direction of rotation is changed through forward/reverse rotation of the drive gear 4, the gear arm 5 is driven by means of the friction resistance torque of the idle gear 7; thus, the changeover of power transmission with respect to the respective reel gears 8 and 9 can be achieved reliably.

In the case of shifting to the queue mode, review mode, or fast-erase mode, the reel stand Ra or Rb is rotated at a high speed, during which state the magnetic head H is caused to contact lightly with the tape. In the above case, the changeover of power transmission with respect to the respective reel gears 8 and 9 is carried out in the same manner as are the cases of fast-feed and rewind.

As described hereinabove, according to the present invention, the friction mechanism is set in such a manner that the resistance torque of the idle gear, out of the paired idle gears, opposite to the supply-side reel gear takes a value larger than that of the other idle gear opposite to the take-up-side reel gear, so that power transmission can be switched by turning the gear arm by means of the idle gear having a larger resistance torque, and the load of the rotary system in the play mode, fast-feed mode, etc. can be made small. Thus, generation of wow and flutter during the play operation can be prevented, and the power consumption of the motor can be suppressed to a minimum.

What is claimed is:

1. A driving device of a tape player of the type having a flywheel, a reversible motor driving the flywheel in one or the other direction, comprising:
  a drive gear on a capstan shaft driven by rotation of the flywheel in one or the other direction;
  a gear arm pivotably mounted on the capstan shaft;

a pair of idle gears rotatably supported on the gear arm each of which is engaged in gear with the drive gear for rotation therewith;

a supply reel stand and a take-up reel stand which are spaced equally from the capstan shaft opposite a respective one of the idle gears, each of said reel stands having a reel gear, wherein one of the reel stands is engaged in gear with its respective idle gear when the gear arm is pivoted in one direction, and the other of the reel stands is engaged in gear with the respective other idle gear when the gear arm is pivoted in the other direction, and a friction mechanism provided only on one of the idle gears for generating a frictional resistance to rotation of the one idle gear by the drive gear which is greater than a frictional resistance to rotation of the other idle gear, such that when the drive gear is driven in one direction, the gear arm is pivoted in one direction, and vice versa, thereby selectively engaging one or the other of the idle gears with a respective one of the reel stands.

2. A driving device of a tape player according to claim 1, wherein a plate spring serving as said mechanism is interposed only between said idle gear opposite to said reel gear of the supply reel stand and a supporting shaft thereof, whereby the turning resistance of said idle gear opposite to said reel gear of said supply reel stand only is set large.

3. A driving device of a tape player according to claim 2, wherein said plate spring has arm portions extending in plural directions which are in contact with the upper surface of said corresponding idle gear.

* * * * *